US011010769B2

(12) United States Patent
Brown et al.

(10) Patent No.: US 11,010,769 B2
(45) Date of Patent: *May 18, 2021

(54) COMPLIANCE SYSTEM FOR DISPLAY UNITS IN A RETAIL SETTING

(71) Applicant: WESTROCK SHARED SERVICES, LLC, Atlanta, GA (US)

(72) Inventors: Stephen Robert Brown, Winston-Salem, NC (US); Philip Alfonso Lazo, Mount Airy, MD (US)

(73) Assignee: WESTROCK SHARED SERVICES, LLC, Atlanta, GA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/446,334

(22) Filed: Jun. 19, 2019

(65) Prior Publication Data

US 2019/0303950 A1  Oct. 3, 2019

Related U.S. Application Data

(63) Continuation of application No. 14/679,671, filed on Apr. 6, 2015, now Pat. No. 10,360,566.

(Continued)

(51) Int. Cl.
  *G06Q 30/02*  (2012.01)
  *G06Q 30/00*  (2012.01)
  *H04W 4/80*  (2018.01)

(52) U.S. Cl.
  CPC ....... *G06Q 30/018* (2013.01); *G06Q 30/0241* (2013.01); *H04W 4/80* (2018.02)

(58) Field of Classification Search
  CPC .... G06Q 30/018; G06Q 30/0241; H04W 4/80
  See application file for complete search history.

(56) References Cited

U.S. PATENT DOCUMENTS

| 4,656,463 A | 4/1987 | Anders et al. |
| 5,920,261 A | 7/1999 | Hughes et al. |

(Continued)

FOREIGN PATENT DOCUMENTS

| AU | 2002362010 B2 | 2/2006 |
| AU | 2004222924 B2 | 6/2008 |

(Continued)

OTHER PUBLICATIONS

"So you've installed an ibeacon system" (published on Jan. 2014 at https://www.recode.net/2014/1/9/11622148/so-youve-installed-an-ibeacon-system-now-comes-the-hard-part-no-one) (Year: 2014).*

(Continued)

*Primary Examiner* — James M Detweiler
(74) *Attorney, Agent, or Firm* — John B. Swingle; Neil G. Cohen

(57) ABSTRACT

A system for monitoring compliance with a retail display program includes a beacon coupled to a promotional display structure. The beacon is configured to transmit a beacon signal that includes a beacon ID and is configured to be received by a user device. A database stores the beacon ID along with a specified retail facility and time period associated with the promotional display structure. A computing device is configured to receive a beacon data record at least partially generated by the user device. The beacon data record includes the beacon ID, a time stamp, and location-specific data associated with a retail facility in which the beacon data record is generated. The computing device is configured to compare the location-specific data and time stamp to the specified retail facility and time period to determine whether the promotional display structure is displayed in the specified retail facility during the specified time period.

19 Claims, 9 Drawing Sheets

Related U.S. Application Data

(60) Provisional application No. 61/976,232, filed on Apr. 7, 2014.

(56) References Cited

U.S. PATENT DOCUMENTS

| | | | |
|---|---|---|---|
| 6,837,427 B2 | 1/2005 | Overhultz et al. | |
| 6,951,305 B2 | 10/2005 | Overhultz et al. | |
| 7,021,535 B2 | 4/2006 | Overhultz et al. | |
| 7,233,241 B2 | 6/2007 | Overhultz et al. | |
| 7,283,037 B2 | 10/2007 | Diorio et al. | |
| 7,310,070 B1 | 12/2007 | Hardman et al. | |
| 7,374,096 B2 | 5/2008 | Overhultz et al. | |
| 7,423,516 B2 | 9/2008 | Overhultz | |
| 7,510,123 B2 | 3/2009 | Overhultz et al. | |
| 7,535,337 B2 | 5/2009 | Overhultz et al. | |
| 7,549,579 B2 | 6/2009 | Overhultz et al. | |
| 7,614,556 B2 | 11/2009 | Overhultz et al. | |
| 7,672,872 B2 | 3/2010 | Shanton | |
| 7,701,339 B2 | 4/2010 | Irmscher et al. | |
| 7,940,181 B2 | 5/2011 | Ramachandra | |
| 8,010,067 B2 | 8/2011 | Pyne | |
| 8,070,065 B2 | 12/2011 | Overhultz et al. | |
| 8,340,581 B2 | 12/2012 | Smith | |
| 8,408,457 B2 | 4/2013 | Overhultz et al. | |
| 8,429,004 B2 | 4/2013 | Hamilton et al. | |
| 8,446,254 B2 | 5/2013 | Carrick et al. | |
| 8,531,273 B2 | 9/2013 | Overhultz et al. | |
| 8,598,988 B2 | 12/2013 | Overhultz et al. | |
| 2003/0097302 A1 | 5/2003 | Overhultz et al. | |
| 2004/0056091 A1 | 3/2004 | Overhultz et al. | |
| 2005/0095573 A1 | 5/2005 | Overhultz et al. | |
| 2005/0243784 A1* | 11/2005 | Fitzgerald | G06Q 30/02 370/338 |
| 2007/0034694 A1 | 2/2007 | Jensen et al. | |
| 2007/0261280 A1 | 11/2007 | Rastegar | |
| 2008/0109309 A1* | 5/2008 | Landau | G09F 27/00 705/14.64 |
| 2008/0197193 A1* | 8/2008 | Overhultz | G06Q 20/201 235/383 |
| 2009/0101712 A1* | 4/2009 | Ulrich | G06Q 10/087 235/383 |
| 2012/0091162 A1 | 4/2012 | Overhultz et al. | |
| 2012/0197715 A1* | 8/2012 | Shani | G06Q 30/0256 705/14.51 |
| 2012/0296777 A1 | 11/2012 | Fugman et al. | |
| 2012/0310570 A1 | 12/2012 | Pyne et al. | |
| 2012/0310720 A1* | 12/2012 | Balsan | G06Q 20/204 705/14.26 |
| 2013/0076726 A1 | 3/2013 | Ferrara et al. | |
| 2013/0238516 A1 | 9/2013 | Moock et al. | |
| 2013/0297422 A1* | 11/2013 | Hunter | H04W 4/023 705/14.58 |
| 2013/0300540 A1 | 11/2013 | Hadley et al. | |
| 2014/0304123 A1* | 10/2014 | Schwartz | G06Q 10/087 705/28 |
| 2015/0237463 A1* | 8/2015 | Stuttle | G01S 5/14 455/456.3 |
| 2015/0242899 A1* | 8/2015 | Farhi | G06Q 30/0261 705/14.58 |

FOREIGN PATENT DOCUMENTS

| | | |
|---|---|---|
| CA | 2586576 A1 | 5/2006 |
| CA | 2519621 C | 10/2011 |
| EP | 1197905 A2 | 4/2002 |

OTHER PUBLICATIONS

NPL—"So you've installed an ibeacon system"—Jan. 2014 (published at https://www.recode.net/2014/1/9/11622148/so-youve-installed-an-ibeacon-system-now-comes-the-hard-part-no-one).

* cited by examiner

COMPLIANCE SYSTEM FOR DISPLAY UNITS IN A RETAIL SETTING

CROSS REFERENCE TO RELATED APPLICATIONS

This application is a continuation application of U.S. patent application Ser. No. 14/679,671, filed Apr. 6, 2015, entitled "COMPLIANCE SYSTEM FOR DISPLAY UNITS IN A RETAIL SETTING", which claims the benefit of U.S. Provisional Application No. 61/976,232, filed Apr. 7, 2014, the contents, including the figures, of each of which are hereby incorporated by reference in their entirety.

BACKGROUND

This disclosure relates generally to monitoring compliance with a retail display program, and more specifically to network-based systems and methods for monitoring the presence of a promotional display structure at a retail facility using an electronic beacon.

At least some known manufacturers and distributors of products for sale in a retail environment arrange to place promotional display structures in certain retail facilities. For example, in association with a marketing or promotional campaign, a manufacturer or distributor may contract with a retailer, such as a supermarket or pharmacy chain, to place a promotional display structure at a specified location in a number of retail facilities. Such promotional display structures may be fabricated, for example, from paperboard and/or corrugated paperboard material printed with desired graphics, slogans, and/or other markings associated with the product and/or the promotional campaign. In some cases, the promotional display structures are configured to hold product for display. At least some known promotional display structures are delivered to each retail facility in a partially assembled condition, for example, flattened with graphics under a protective cover, and one or more simple steps must be performed to erect the promotional display structure at the retail facility. In some cases, the promotional displays are delivered to the retail facilities within a protective cover or outer box with the products to be sold from the promotional displays already packed within the promotional displays.

The value of such a retail display program depends upon the promotional display structures being displayed at each agreed-upon retail facility during a specified time period, for example (i) the same time period in which other aspects of the promotional campaign, such as television, radio, newspaper, direct mail, and/or internet-based advertisements, are active; (ii) during a particular shopping season (e.g., Christmas, Halloween, etc.); or (iii) during a period of time leading up to a big event (e.g., the Super Bowl, etc.). The value of such a retail display program also depends upon the promotional display structures being displayed in the correct location within each retail facility, for example as the end-cap of a specified aisle, or near the check-out area. However, monitoring compliance with these time period and location requirements may be difficult for manufacturers, distributors, and retail chain personnel to accomplish.

It is known to monitor promotional display compliance using on-site reports from manufacturer sales representatives, store delivery personnel, or independent survey companies, for example. However, a logistical complexity and overall cost of collecting and analyzing on-site reports may be relatively high, and the results of the analysis may come too late to rectify compliance errors while the promotional campaign is active. It is also known to capture images of the specified locations at the retail facility and apply automated image processing to determine if the correct specialized display structure is present, but again, a logistical complexity and overall cost of hardware for collecting and analyzing images may be relatively high.

At least some known systems monitor promotional display compliance using dedicated radio frequency transmitters and receivers within each retail facility to track radio frequency identification (RFID) tags coupled to promotional product displays. However, a cost of dedicated transmitters and receivers for each retail facility may be relatively high. Further, while the use of dedicated transmitters may be reduced by using active (self-powered) RFID tags on each promotional display structure, steps must be taken to ensure that a power source for each active tag maintains sufficient power over the specified time period for display. For example, it may be necessary to equip the RFID tag with sophisticated energy-saving techniques, leading to an increased cost for each tag. Alternatively or in addition, product delivery or retail facility personnel may be tasked with an additional duty to locate and properly activate the power source for each active tag when the display structure is placed at the specified location, a duty which may be forgotten or performed incorrectly because it is outside the scope of their usual duties.

In addition, at least some known systems provide for audiovisual advertising or promotional resources to be provided in association with the promotional display structure. Typically, the audiovisual promotional resource is provided via a dedicated media device, such as a video screen or a coupon printer, for example, installed in the retail facility. However, such known systems require a relatively high-cost dedicated media device and a relatively high logistical complexity in associating the correct promotional message with the promotional display structure currently in place.

BRIEF DESCRIPTION OF THE DISCLOSURE

In one aspect, a system for monitoring compliance with a retail display program is provided. The retail display program includes a promotional display structure intended to be displayed at a specified retail facility during a specified time period. The system includes a beacon coupled to the promotional display structure. The beacon is configured to transmit a beacon signal that includes a beacon ID. The beacon signal is configured to be received by a user device. The system also includes a database storing the beacon ID along with the specified retail facility and the specified time period associated with the promotional display structure. The system further includes a computing device in communication with the database. The computing device is configured to receive a beacon data record at least partially generated by the user device. The beacon data record comprises the beacon ID, a time stamp, and location-specific data associated with a retail facility in which the beacon data record is generated. The computing device also is configured to retrieve the specified retail facility and the specified time period linked to the beacon ID from the database, compare the location-specific data to the specified retail facility to determine whether the promotional display structure is displayed in the specified retail facility, and compare the specified time period to the time stamp to determine whether the promotional display structure is displayed during the specified time period.

In another aspect, a method for monitoring compliance with a retail display program is provided. The retail display program includes a promotional display structure intended to be displayed at a specified retail facility during a specified time period. The method includes transmitting a beacon signal from a beacon coupled to the promotional display structure. The beacon signal includes a beacon ID, and the beacon signal is configured to be received by a user device. The method also includes storing the beacon ID along with the specified retail facility and the specified time period associated with the promotional display structure in a database. The method further includes receiving a beacon data record at least partially generated by the user device. The beacon data record includes the beacon ID, a time stamp, and location-specific data associated with a retail facility in which the beacon data record is generated. Additionally, the method includes retrieving the specified retail facility and the specified time period linked to the beacon ID from the database, comparing the location-specific data to the specified retail facility to determine whether the promotional display structure is displayed in the specified retail facility, and comparing the specified time period to the time stamp to determine whether the promotional display structure is displayed during the specified time period.

In another aspect, a computer-readable storage medium having computer-executable instructions for monitoring compliance with a retail display program is provided. The retail display program includes a promotional display structure intended to be displayed at a specified retail facility during a specified time period. When executed by at least one processor, the computer-executable instructions cause the at least one processor to receive a beacon data record. The beacon data record is at least partially generated by a user device in response to a beacon signal from a beacon coupled to the promotional display structure. The beacon data record includes a beacon ID, a time stamp, and location-specific data associated with a retail facility in which the beacon data record is generated. The computer-executable instructions also cause the at least one processor to retrieve the specified retail facility and the specified time period associated with the promotional display structure from a database. The database stores the beacon ID associated with the promotional display structure, along with the specified retail facility and the specified time period. The computer-executable instructions further cause the at least one processor to compare the location-specific data to the specified retail facility to determine whether the promotional display structure is displayed in the specified retail facility, and compare the specified time period to the time stamp to determine whether the promotional display structure is displayed during the specified time period.

DETAILED DESCRIPTION OF THE DISCLOSURE

The system and methods described herein overcome the limitations of known compliance-monitoring methods. The system and methods described herein include a beacon coupled to a promotional display structure. The system and methods described herein also provide for a computing device that receives information from each beacon, relayed directly through a user device, such as a smart phone, carried by customers and/or employees of a retail facility in which the promotional display structure is displayed. A reference beacon may be used to facilitate obtaining specific location data for the promotional display structure within the retail facility. In certain embodiments, the system and methods described herein provide incentives for the operator of the user device to enable the user device to relay the beacon information.

Figure 1:
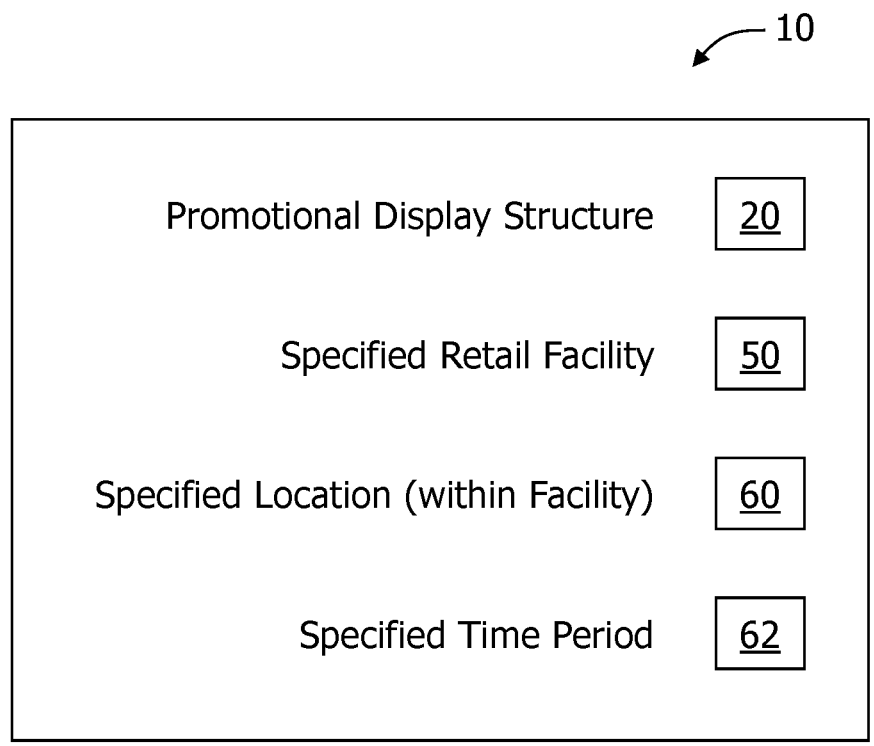
FIG. 1 is a schematic view of an example embodiment of a retail display program.

FIG. 1 is a schematic view of an example embodiment of a retail display program 10. Retail display program 10 includes a plurality of promotional display structures 20. Each promotional display structure 20 is intended to be displayed at a specified retail facility 50. Moreover, in the example embodiment, each promotional display structure 20 is intended to be displayed at a specified location 60 within specified retail facility 50. For example, specified location 60 may be described as "end cap of snack chip aisle" or "display area in front of prescription pick-up window." In addition, retail display program 10 includes a specified time period 62 during which promotional display structure 20 is intended to be on display. Retail display program 10 may be implemented simultaneously at a plurality of retail facilities 12 (shown in FIGS. 4 and 5).

Figure 2:
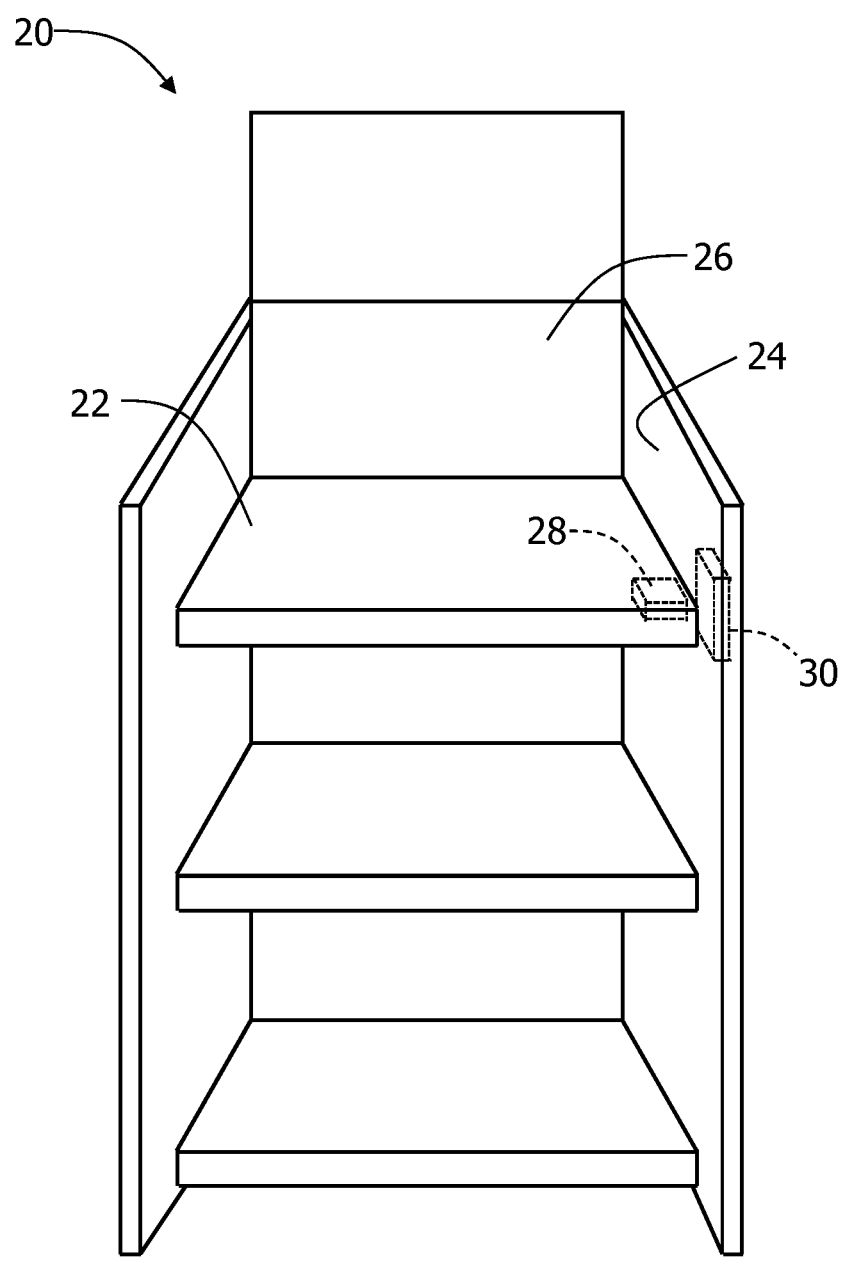
FIG. 2 is a perspective view of an example embodiment of a promotional display structure that may be used as part of the retail display program shown in FIG. 1.
Figure 3:
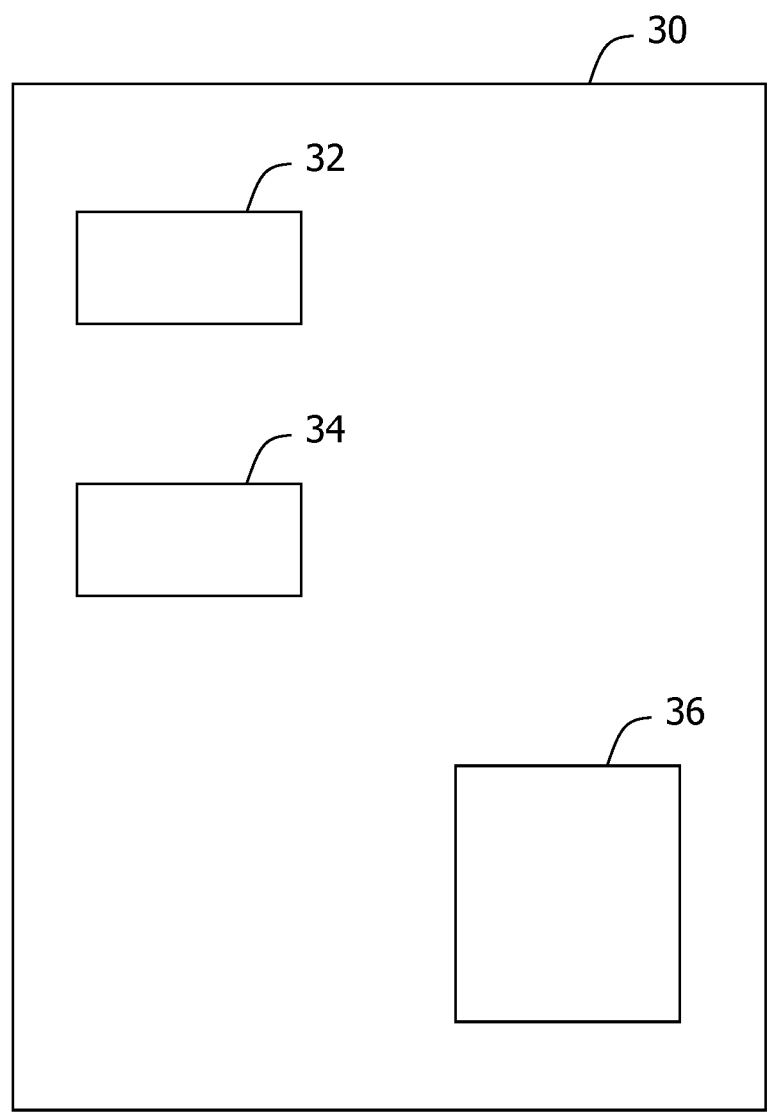
FIG. 3 is a schematic view of an example embodiment of a beacon that may be coupled to the promotional display structure shown in FIG. 2.

FIG. 2 is a perspective view of an example embodiment of promotional display structure 20. A beacon 30 is coupled to promotional display structure 20. FIG. 3 is a schematic illustration of an example embodiment of beacon 30. With reference to FIGS. 2 and 3, in the example embodiment, promotional display structure 20 includes at least one shelf 22 configured to hold and display a product, and at least one side wall 24 configured to support shelf 22. In alternative embodiments, promotional display structure 20 includes additional or alternative structure, for example, a hook or a basket (not shown), for holding and/or displaying products. In other alternative embodiments, promotional display structure 20 is not configured to hold or support products, but instead is configured simply to display printed promotional graphics and/or messages. Promotional display structure 20 may be fabricated from one or more of paper, paperboard, corrugated paperboard, bristol board, foam cored board, plastic, or any other material that allows promotional display structure 20 to function as described herein. In the example embodiment, promotional display structure 20 is configured to be shipped to a retail facility 12 in a disassembled or partially assembled condition, and to be erected for display at retail facility 12. For example, in the shipping configuration, shelf 22 and/or side wall 24 may be folded flat against a back wall 26.

In certain embodiments, beacon 30 is embedded within the material from which promotional display structure 20 is fabricated. For example, beacon 30 may be disposed between juxtaposed layers of foam core, paperboard, or corrugated paperboard, or within the flutes of a corrugated layer. In alternative embodiments, beacon 30 may be coupled to promotional display structure 20 in any suitable fashion, for example by using an adhesive, either during or after manufacture of promotional display structure 20. In the example embodiment, beacon 30 is coupled within wall 24, proximate shelf 22 of promotional display structure 20. Alternatively, beacon 30 may be coupled to back wall 26, for example.

Beacon 30 is an electronic device configured to store and transmit at least a beacon identification ("beacon ID") 32. More specifically, each beacon 30 to be used in retail display program 10 contains a unique beacon ID 32. In certain embodiments, each beacon 30 also is configured to store and transmit a promotional message 34. Promotional message 34 may be, for example, an electronic coupon or a uniform resource locator ("URL") associated with a specific web page available on the World Wide Web.

Beacon 30 obtains power for its operations from a power source 36, such as a battery, integral with or coupled to beacon 30. In certain embodiments, in order to prolong an operational lifetime of power source 36, power source 36 is dormant until promotional display structure 20 is erected for display. Moreover, in some embodiments, promotional display structure 20 is configured such that power source 36 is activated automatically when promotional display structure 20 is erected. In the example embodiment, shelf 22 is configured to be attached to wall 24 when promotional display structure 20 is erected at the retail facility. Shelf 22 includes a member 28 that is disposed to contact beacon 30 in wall 24 when promotional display structure 20 is in an erected condition. Member 28 and beacon 30 are configured such that power source 36 is activated when member 28 contacts beacon 30. Alternatively, member 28 is a magnet, and beacon 30 is configured such that power source 36 is activated by magnetized member 28 when shelf 22 is attached to wall 24.

In another alternative embodiment for activating power source 36, power source 36 is coupled to back wall 26, and promotional display structure 20 is shipped in a shipping configuration in which side wall 24 is folded flat against back wall 26. Power source 36 is operatively coupled to side wall 24 such that power source 36 is activated when side wall 24 is rotated away from back wall 26 in the course of erecting promotional display structure 20 for display at retail facility 12. In still another alternative embodiment, a manual tear strip on an outer cover (not shown) of promotional display structure 20 is provided to facilitate erection of promotional display structure 20 at retail facility 12, and power source 36 is operatively coupled to the tear strip such that power source 36 is activated when the tear strip is pulled. In other alternative embodiments, any suitable structure, such as a manually operated switch, is provided for activating power source 36. In certain embodiments, power source 36 is activated before beacon 30 is coupled to promotional display structure 20 or before promotional display structure 20 is shipped to retail facility 12.

Beacon 30 is configured to wirelessly transmit an electromagnetic beacon signal 38 (shown in FIG. 4) that includes at least beacon ID 32. In the example embodiment, beacon 30 is a low-energy Bluetooth ("Bluetooth LE") device, and beacon signal 38 is configured to be read at a distance of up to approximately 150 feet from beacon 30 according to protocols established in an iBeacon application programming interface ("API") available through Apple Inc., 1 Infinite Loop Cupertino, Calif. 95014. In particular, beacon signal 38 is configured such that proximity to beacon 30 can be calculated from received beacon signal 38.

Figure 4:
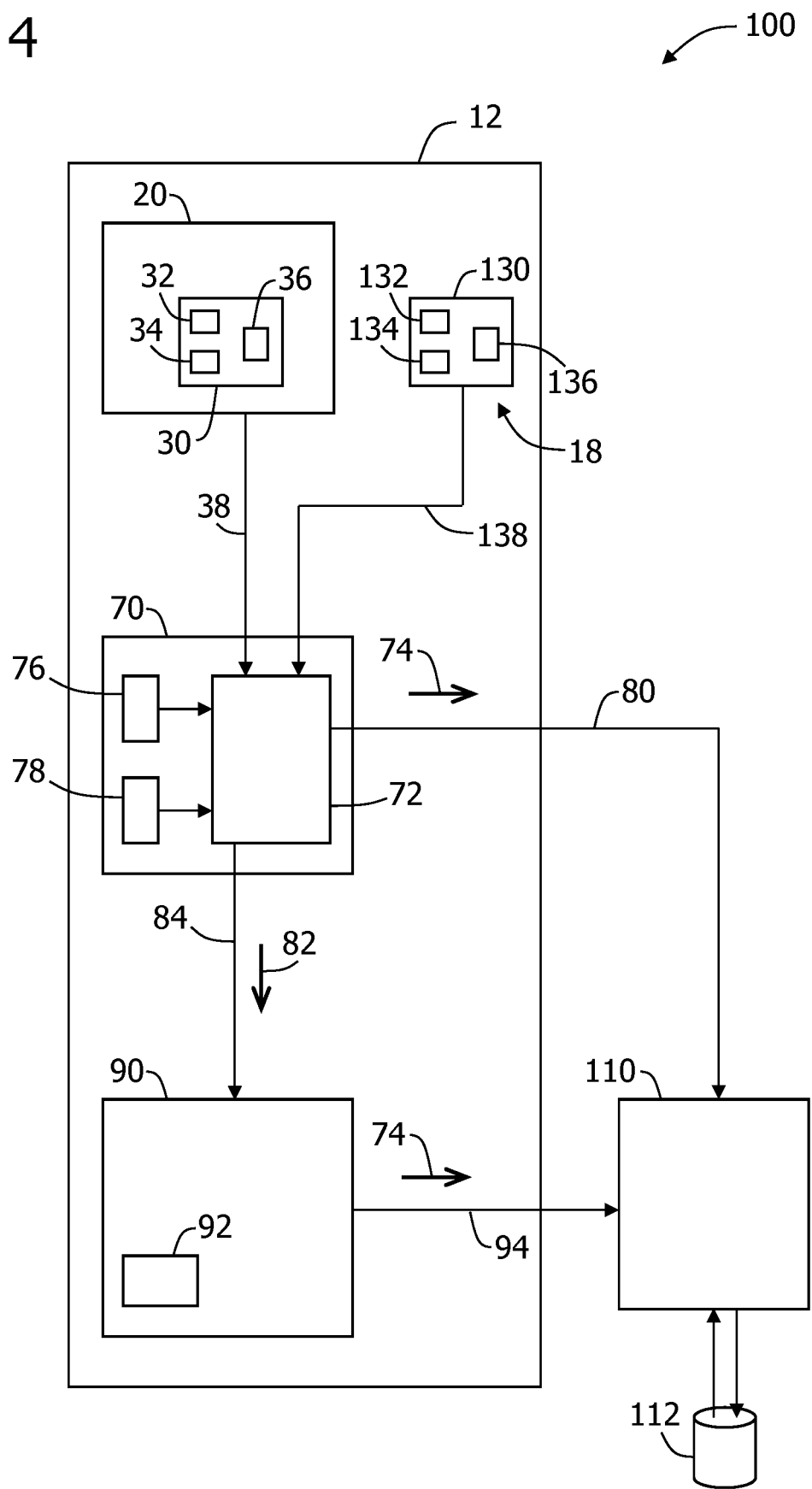
FIG. 4 is a simplified block diagram of an example embodiment of a system that may be used for monitoring compliance with the retail display program shown in FIG. 1.

FIG. 4 is a simplified block diagram of an example embodiment of a system 100 for monitoring compliance with a retail display program. System 100 includes beacon 30, coupled to promotional display structure 20, located within a corresponding retail facility 12. System 100 is configured to make use of at least one user device 70, such as a smart cellular telephone, an electronic tablet device, a wearable computing device, or any other computing device capable of performing the tasks described herein, configured to receive beacon signal 38 from beacon 30. In the example embodiment, user device 70 is carried by a customer present at retail facility 12. In alternative embodiments, user device 70 is carried by an employee of retail facility 12.

User device 70 includes a beacon software application 72 that is configured to transmit a beacon data record 74 to a computing device 110 located remotely from retail facility 12 in response to beacon signal 38 received by user device 70. In an embodiment, beacon software application 72 is a smart phone application installed by the user. In alternative embodiments, all or part of beacon software application 72 is provided to user device 70 as embedded code from a web site accessed by user device 70. The user of user device 70 may be provided with an incentive to install beacon software application 72 or to visit the web site that provides the embedded code, as will be described herein. In the example embodiment, once activated, beacon software application 72 requires no action or input from an operator of user device 70 to function as described herein. For example, beacon signal 38 may include a program code that identifies beacon 30 as part of a retail display program, and beacon software application 72 may be configured to recognize the program code. In alternative embodiments, beacon software application 72 may accept or require input from the operator of user device 70 as part of its function.

Beacon software application 72 is configured to extract beacon ID 32 from beacon signal 38. In addition, beacon software application 72 is configured to obtain a time stamp associated with received beacon signal 38. For example, beacon software application 72 may obtain the time stamp from a standard time-keeping function of user device 70. In some embodiments, beacon software application 72 is configured to obtain a plurality of time stamps while user device 70 continues to receive beacon signal 38, such that a duration or "dwell time" of user device 70 near promotional display structure 20 may be established.

In addition, in certain embodiments, beacon software application 72 is configured to calculate a proximity of user device 70 to beacon 30 and to transmit beacon ID 32 to computing device 110 only if user device 70 is within a specified range of beacon 30. As described above, such proximity calculations are available if beacon software application 72 is configured to use an iBeacon API, for example. Moreover, the specified range setting used by beacon software application 72 may be included in beacon data record 74. In an embodiment, beacon software application 72 is configured to transmit beacon data record 74 to computing device 110 only if user device 70 is within approximately six feet or less of beacon 30. Thus, it should be understood that beacon data record 74 provides an indication that the customer carrying user device 70 is in position to engage with promotional display structure 20.

Further, beacon data record 74 includes location-specific data that is associated with the retail facility 12 in which beacon data record 74 is generated. Thus, the location-specific data enables computing device 110 to identify retail facility 12. For example, in an embodiment, user device 70 includes a geo-location application 76. Geo-location application 76 may be a standard Global Positioning Satellite ("GPS") application installed on user device 70. Beacon software application 72 receives a geographic position of user device 70 from geo-location application 76 and includes the geo-location data in beacon data record 74. Computing device 110 is configured to use the geo-location data from beacon data record 74 to identify retail facility 12, as will be described in more detail. Alternatively, beacon software application 72 is configured to include a unique retail facility identification ("retail facility ID") 78 associated with retail facility 12 in beacon data record 74 to enable computing device 110 to identify retail facility 12.

In the example embodiment, beacon software application 72 forwards beacon data record 74 directly to computing device 110 via a signal wirelessly transmitted from user device 70, as illustrated by a signal path 80. Signal path 80 may include both a wireless and wired component. For example, signal path 80 may include user device 70 transmitting over a cell phone network or an IEEE 802.11 standard wireless local area network having a wireless internet access point, and then through a wired connection via a standard internet service provider ("ISP") to computing device 110. Alternatively, signal path 80 includes any suitable transmission path or combination of transmission paths that enables system 100 to function as described herein.

In an alternative embodiment, beacon data record 74 is transmitted to computing device 110 indirectly via a hub 90 associated with retail facility 12. More specifically, beacon software application 72 transmits at least a partial beacon data record 82 to hub 90 via a wireless signal path 84. For example, wireless signal path 84 may include user device 70 transmitting over an IEEE 802.11 standard wireless local area network in retail facility 12. Alternatively, signal path 84 includes any suitable transmission path or combination of transmission paths that enables system 100 to function as described herein.

In an embodiment, partial beacon data record 82 includes beacon ID 32 and the time stamp, and hub 90 is configured to add location-specific data in the form of a hub identification ("hub ID") 92 to create beacon data record 74. Moreover, computing device 110 is configured to use hub ID 92 from beacon data record 74 to identify retail facility 12, as will be described in more detail. Alternatively, hub 90 may include a geo-location application (not shown) similar to geo-location application 76, and hub 90 may add geo-location data to partial beacon data record 82 to create beacon data record 74. Hub 90 is configured to transmit beacon data record 74 to computing device 110 via a signal path 94 that may be a wired internet connection, a wireless internet connection, a combination of the two, or any other suitable signal path that enables system 100 to function as described herein.

Computing device 110 is configured to use beacon data record 74 to determine if promotional display structure 20 is correctly displayed in accordance with retail display program 10. For example, computing device 110 is coupled to a database 112 that links each unique beacon ID 32 to the specified retail facility 50 in which promotional display structure 20 corresponding to beacon ID 32 was intended to be displayed, as well as the specified time period 62 for display. Computing device 110 is configured to extract beacon ID 32 from beacon data record 74 and retrieve the associated specified retail facility 50 and specified time period 62 from database 112.

Computing device 110 is configured to compare the specified values from database 112 to the location-specific data and time stamp data from beacon data record 74. In an embodiment, beacon data record 74 contains geo-location data for retail facility 12, and database 112 further links each specified retail facility 50 in retail display program 10 to its geographic location. Computing device 110 further is configured to retrieve the location of specified retail facility 50 from database 112, extract the geo-location data from beacon data record 74, and compare the values to determine whether promotional display structure 20 is displayed in the correct retail facility.

In an alternative embodiment, beacon data record 74 contains retail facility ID 78 associated with retail facility 12, and database 112 further links each specified retail facility 50 in the retail display program to its retail facility ID. Computing device 110 is configured to retrieve the retail facility ID of specified retail facility 50 from database 112, extract retail facility ID 78 from beacon data record 74, and compare the values to determine whether promotional display structure 20 is displayed in the correct retail facility.

In another alternative embodiment, beacon data record 74 contains hub ID 92 for retail facility 12, and database 112 further links each specified retail facility 50 in retail display program 10 to its hub ID. Computing device 110 is configured to retrieve the hub ID of specified retail facility 50 from database 112, extract hub ID 92 from beacon data record 74, and compare the values to determine whether promotional display structure 20 is displayed in the correct retail facility.

In addition to determining whether promotional display structure 20 is displayed in the correct retail facility, computing device 110 is further configured to retrieve specified time period 62 for display from database 112, extract the actual time stamp from beacon data record 74, and compare the values to determine if promotional display structure 20 is displayed during the correct time period. Thus, computing device 110 determines whether promotional display structure 20 is correctly displayed in accordance with the retail display program.

In certain embodiments, computing device 110 further stores each beacon data record 74 in a set of beacon data records 74 received from a plurality of user devices 70 that pass within a given range, such as six feet, of each promotional display structure 20 in each retail facility 12 involved in retail display program 10. Assuming that each user device 70, or alternatively a certain non-employee proportion of user devices 70, is associated with a customer present in the corresponding retail facility 12, computing device 110 is operable to store detailed data regarding customer exposure to each promotional display structure 20 in each retail facility 12 involved in retail display program 10. The set of stored beacon data records may be used to evaluate an effectiveness of retail display program 10. In certain embodiments, the stored data may be compared against known and/or modeled customer traffic patterns, for example, for retail facility 12 to evaluate whether promotional display structure 20 is located at the correct specified location 60 within specified retail facility 50. If few or no beacon data records 74 arrive for a particular beacon ID 32 associated with retail display program 10, computing device 110 may be configured to indicate that the promotional display structure 20 associated with the particular beacon ID 32 is not correctly displayed. In certain embodiments, computing device 110 is configured to analyze the stored data in conjunction with, or in addition to, other data sources, such as but not limited to photographic, video, or motion-sensing data from retail facility 12 or another retail facility, to facilitate evaluating the effectiveness of retail display program 10.

In some embodiments, at least one reference beacon 130 also is located in retail facility 12. Reference beacon 130 is configured to enable system 100 to more directly determine whether promotional display structure 20 is located at the correct specified location 60. Similarly to beacon 30, reference beacon 130 includes a unique reference beacon ID 132 and a power source 136. However, each reference beacon 130 remains at a corresponding preselected location 18 in retail facility 12.

More specifically, the intended specified location 60 for each promotional display structure 20 may be linked to the corresponding beacon ID 32 in database 112. For example, database 112 may store a code corresponding to specified location 60, rather than a complete description such as "end cap of snack chip aisle" or "display area in front of pharmacy pick-up window." Moreover, each preselected location 18 for a reference beacon 130 is in proximity to a specified location 60 typically used for retail display programs in retail facility 12. In database 112, each specified location 60 is mapped to a corresponding preselected location 18, and each reference beacon ID 132 also is linked to its corresponding preselected location 18.

Reference beacon 130 is configured to wirelessly transmit an electromagnetic reference beacon signal 138 that includes at least reference beacon ID 132. In the example embodiment, reference beacon signal 138 is configured to be read using the same protocol used to read beacon signal 38. For example, reference beacon 130 may be a Bluetooth LE device, and reference beacon signal 138 is configured to be read using an iBeacon API.

In the example embodiment, beacon software application 72 is configured to respond to reference beacon signal 138. For example, beacon software application 72 may be configured to listen for reference beacon signal 138 after beacon signal 38 is recognized. Reference beacon signal 138 may include a reference code that identifies reference beacon 130 as part of retail display program 10. More specifically, beacon software application 72 is configured to extract reference beacon ID 132 from reference beacon signal 138. Beacon software application 72 is further configured to include reference beacon ID 132, if reference beacon signal 138 is received, or to include an indicator that no reference beacon was detected, if no reference beacon signal 138 is received.

In some embodiments that include at least one reference beacon 130, computing device 110 is configured to use beacon data record 74 to determine directly if promotional display structure 20 is displayed in the correct specified location 60. For example, computing device 110 is configured to extract reference beacon ID 132 from beacon data record 74 and retrieve its associated preselected location 18 from database 112. Because beacon data record 74 indicates that reference beacon signal 138 and beacon signal 38 were both detected by beacon software application 72 in a narrow time window represented by the time stamp, it is clear that promotional display structure 20 was located in proximity to preselected location 18. Computing device 110 also is configured to retrieve specified location 60 associated with beacon ID 32 and compare it to preselected location 18 to determine whether promotional display structure 20 is displayed in the correct specified location 60.

Additionally or alternatively, beacon software application 72 may be configured to take further steps in response to any detected reference beacon signal 138, regardless of whether a beacon signal 38 has been identified. For example, beacon software application 72 may be configured to transmit a beacon data record 74 that contains data only for reference beacon ID 132 and the time stamp. Computing device 110 is configured to indicate in response to such beacon data record 74 that preselected location 18 associated with reference beacon 130 is currently devoid of any promotional display structure 20 associated with retail display program 10.

Figure 5:
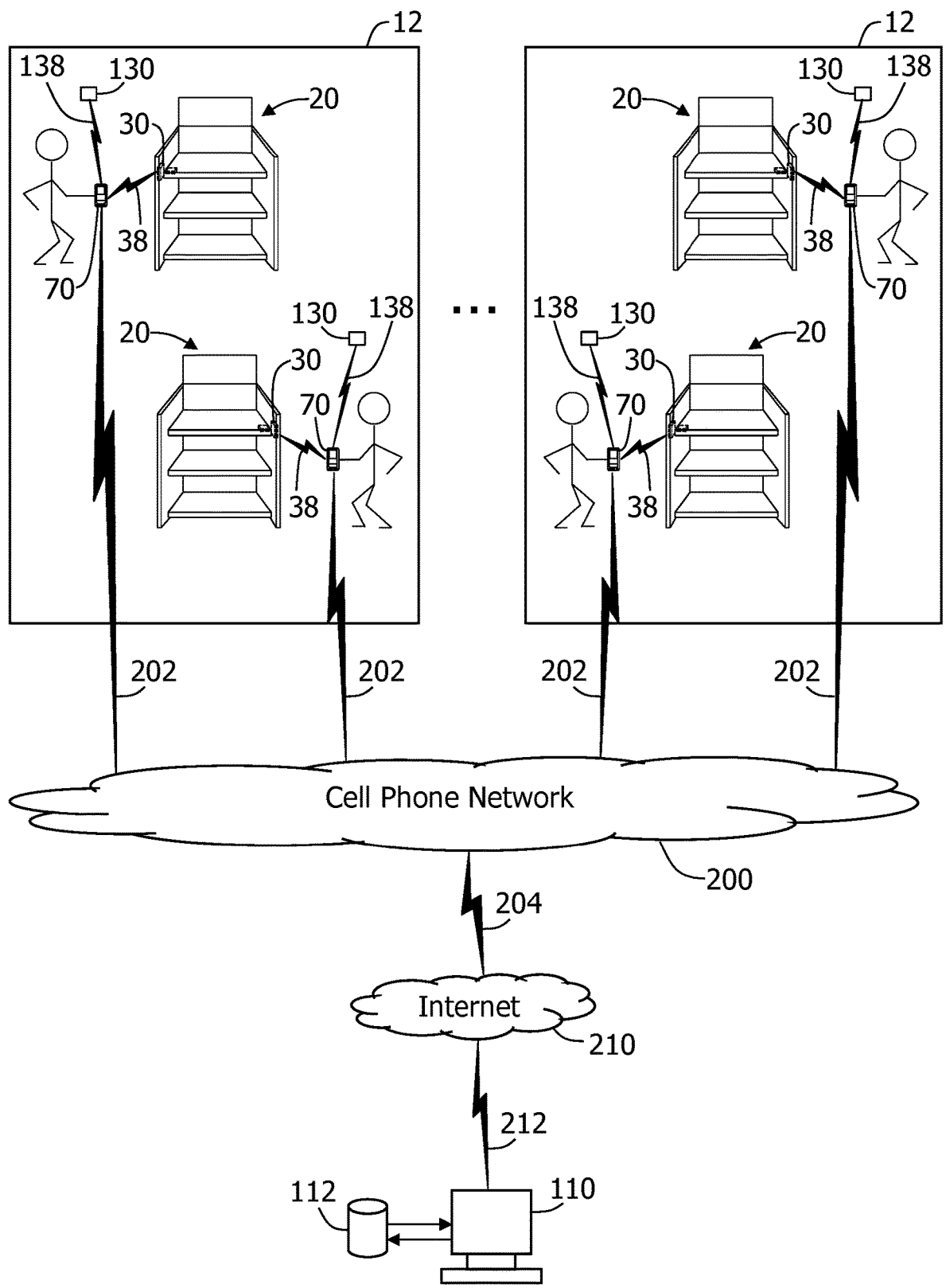
FIG. 5 is an expanded block diagram of the system shown in FIG. 4 for monitoring compliance with the retail display program shown in FIG. 1.

FIG. 5 is an expanded block diagram of system 100. In the example embodiment, each of a plurality of retail facilities 12 hosts at least one promotional display structure 20. A beacon 30 is coupled to each promotional display structure 20, and a reference beacon 130 is installed proximate each promotional display structure 20 at a preselected location 18. A plurality of customers and/or employees at each retail facility 12 carry user devices 70, such as smart phones. Each user device 70 operates beacon software application 72 (shown in FIG. 4). Each time a particular user device 70 passes within a specified proximity of a beacon 30 and/or a reference beacon 130, a corresponding beacon signal 38 and/or reference beacon signal 138 is received by the particular user device 70. In response, the user device 70 generates a beacon data record 74 (shown in FIG. 4) and transmits it via a signal 202 to a cell phone network 200. Cell phone network 200 passes the beacon data record 74 through an interface 204 to the Internet 210. The beacon data record 74 passes to computing device 110 via an ISP connection 212. Signal 202, cell phone network 200, interface 204, Internet 210, and ISP connection 212 together form signal path 80 (shown in FIG. 4). Alternatively, as shown in FIG. 4, hub 90 may be used to complete partial beacon data record 82 received from user device 70 and to forward beacon data record 74 through the Internet 210 to computing device 110.

As described above, in the example embodiment, system 100 relies in part on user devices 70 associated with customers of retail facility 12. For example, a customer may choose to install beacon software application 72 on the customer's user device 70 as part of a customer reward program, frequent shopper program, coupon program, or the like associated with retail facility 12 or with a third-party shopping network. However, regardless of how the customer may use an associated application on user device 70 to interact with other aspects of the customer reward program, frequent shopper program, coupon program, or the like, in the example embodiment, once activated, beacon software application 72 requires no action or input from the customer to function as described herein. In alternative embodiments, beacon software application 72 may accept or require input from the customer as part of its function.

System 100 also may be configured to provide an incentive directly to customers to install beacon software application 72. For example, as described above, beacon 30 may be configured to transmit promotional message 34, such as an electronic coupon for a product associated with promotional display structure 20 or a uniform resource locator ("URL") associated with a specific web page available on the World Wide Web that offers coupons and promotional materials for a product associated with promotional display structure 20. Transmitting and reading of such promotional messages may be supported, for example, by an iBeacon API. A benefit of simply providing an URL in promotional message 34 is that the associated web page may be updated as frequently as desired to reflect changes to any available promotions, without a need to reprogram each beacon 30 or beacon software application 72 to reflect the changes. The operator of user device 70 may download coupons or other promotional materials directly from the web page while still in retail facility 12, and make use of the downloaded coupons or promotional materials immediately. In addition, all or part of beacon software application 72 may be provided to user device 70 as embedded code from the web page, thus facilitating the provision of functional updates to beacon software application 72. Additionally or alternatively, other suitable methods are used to incentivize customers to install and operate beacon software application 72 on their user devices 70.

In certain embodiments, at least one employee of retail facility 12 carries user device 70 in addition to, or as an alternative to, reliance on customer user devices 70. Beacon software application 72 may transmit beacon data records 74 as the employee passes by promotional display structure 20 in the normal course of duties, or the employee may be tasked with visiting each promotional display structure 20 at periodic intervals to enable the collection of compliance data by beacon software application 72. Once again, in the example embodiment, once activated, beacon software application 72 requires no action or input from the employee. In alternative embodiments, beacon software application 72 may accept or require input from the employee as part of its function. While reliance on employees, rather than customers, reduces an ability of system 100 to collect customer interaction data, system 100 remains effective in tracking compliance with retail display program 10.

Figure 6:
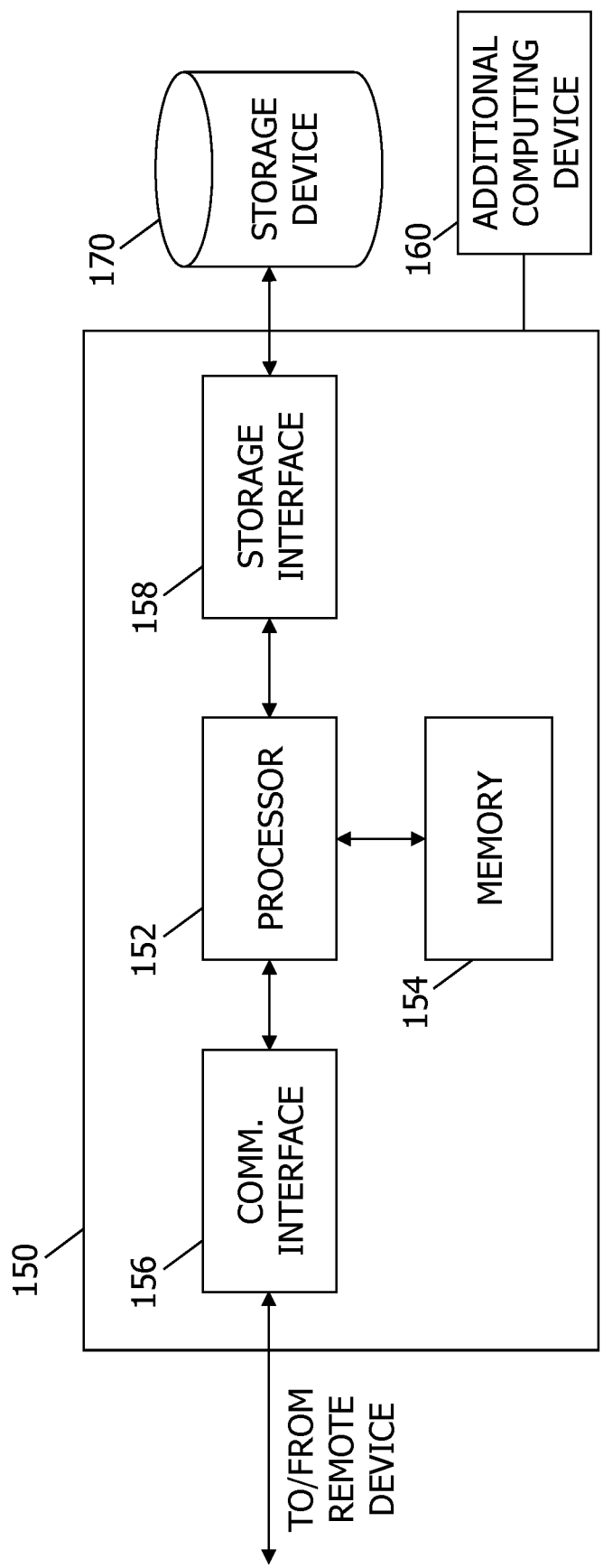
FIG. 6 is a simplified block diagram of an example configuration of a computing device that may be used as part of the system shown in FIGS. 4 and 5.

FIG. 6 is a simplified block diagram of an example configuration of a computing device 150 that may be used for computing device 110 (shown in FIGS. 4 and 5). In the example embodiment, computing device 150 includes one or more processors 152 for executing instructions. Instructions may be stored in a memory area 154, for example. Processor 152 may include one or more processing units (e.g., in a multi-core configuration) for executing instructions. The instructions may be executed within a variety of different operating systems on computing device 150. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Computing device 150 may be communicatively coupled to one or more additional computing devices 160. In the example embodiment, computing device 150 may be accessed by multiple computing devices 160. For example, additional computing device 160 may be a stand-alone computing device coupled to one or more memory devices. In some embodiments, computing device 160 may be a specifically programmed section of computing device 150 configured to perform the functions described herein when executed by processor 152.

Processor 152 is operatively coupled to a communication interface 156 such that computing device 150 is capable of communicating with a remote device. For example, communication interface 156 may communicate with remote devices via the Internet 210 (illustrated in FIG. 5). When computing device 110 is implemented using the configuration of computing device 150, the remote devices may be user device 70 and/or hub 90, for example.

Processor 152 may be operatively coupled to a storage device 170. Storage device 170 is any computer-operated hardware suitable for storing and/or retrieving data. In some embodiments, storage device 170 is integrated in computing device 150. For example, computing device 150 may include one or more hard disk drives as storage device 170. In other embodiments, storage device 170 is external to computing device 150 and may be accessed by a plurality of computing devices 150. For example, storage device 170 may include multiple storage units such as hard disks or solid state disks in a redundant array of inexpensive disks (RAID) configuration. Storage device 170 may include a storage area network (SAN) and/or a network attached storage (NAS) system. Database 112 (shown in FIGS. 4 and 5) may be implemented on one or more storage devices 170.

In some embodiments, processor 152 is operatively coupled to storage device 170 via a storage interface 158. Storage interface 158 is any component capable of providing processor 152 with access to storage device 170. Storage interface 158 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 152 with access to storage device 170.

Memory area 154 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

The different components illustrated herein for computing device 150 are not meant to provide architectural limitations to the manner in which different embodiments may be implemented. The different illustrative embodiments including computing device 110 and/or database 112 may be implemented in a computer system including components in addition to or in place of those illustrated for computing device 150.

Figure 7A:
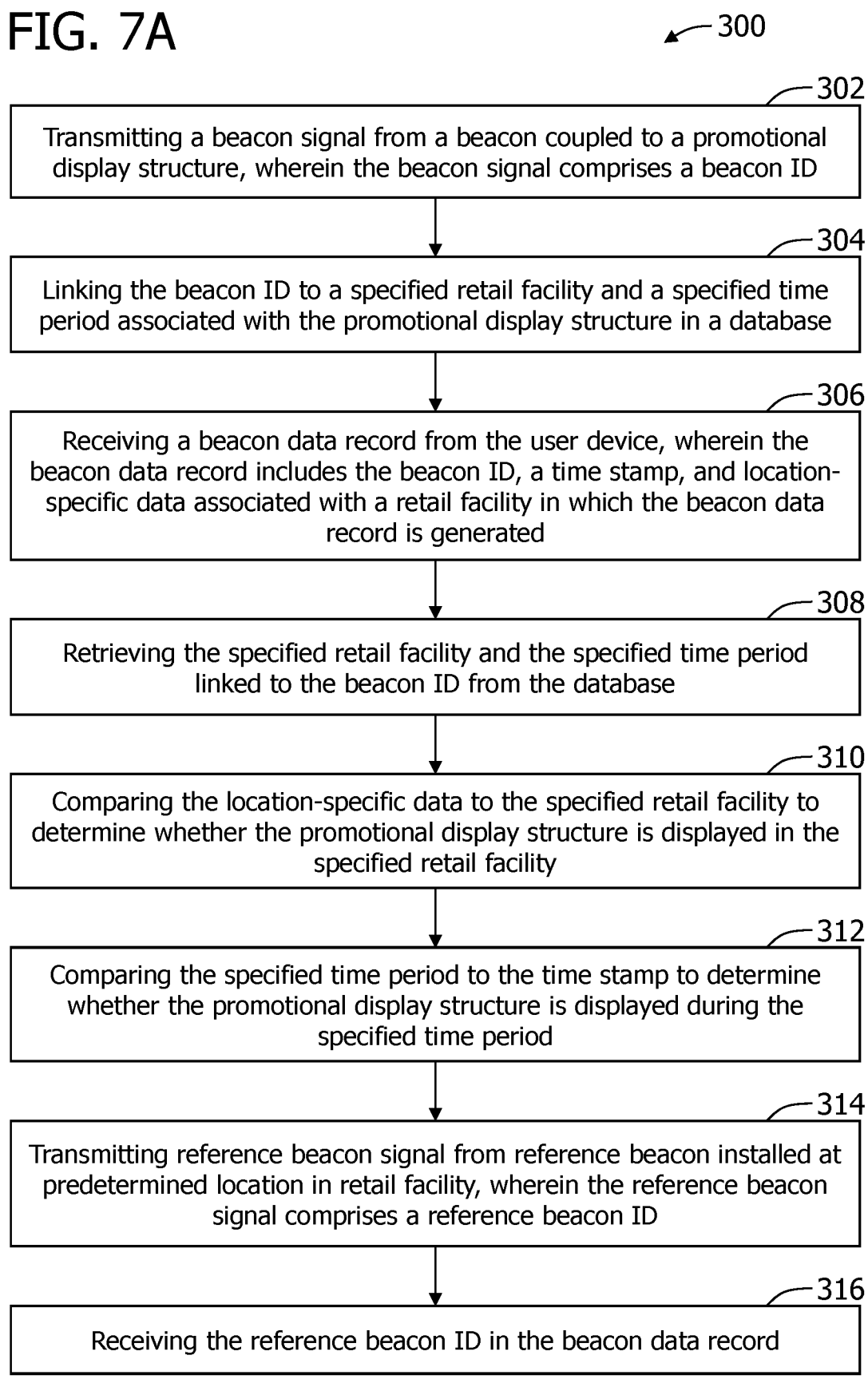
FIGS. 7A and 7B are a flow diagram of an example embodiment of a method for monitoring compliance with the retail display program shown in FIG. 1.
Figure 7B:
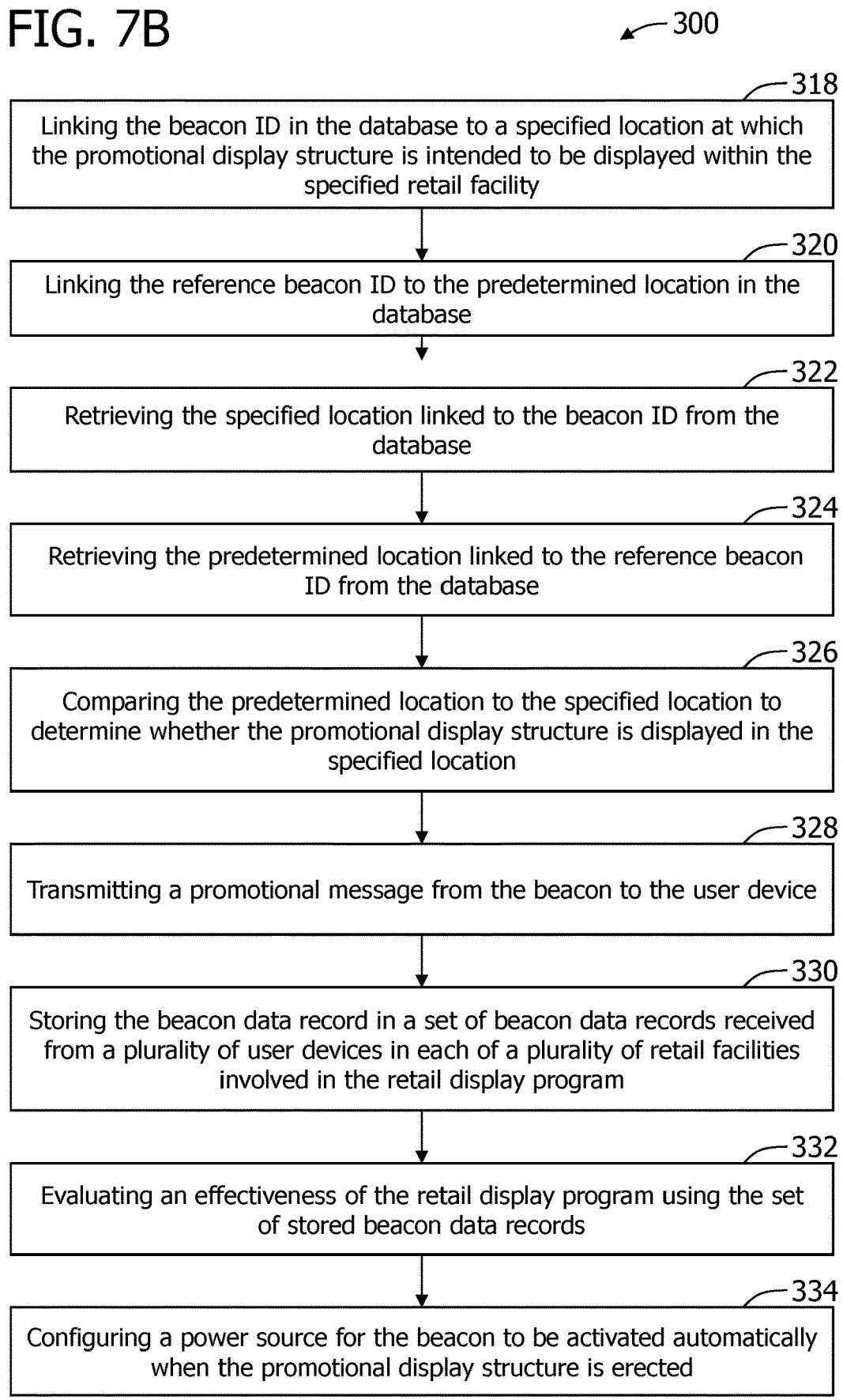

FIGS. 7A and 7B are a flow diagram of an example embodiment of a method 300 for monitoring compliance with a retail display program, such as retail display program 10. Method 300 includes transmitting 302 a beacon signal from a beacon, such as beacon 30, coupled to a promotional display structure, such as promotional display structure 20. The beacon signal comprises a beacon ID, and the beacon signal is configured to be read by a user device, such as user device 70, proximate the promotional display structure. Method 300 also includes linking 304 the beacon ID to a specified retail facility and a specified time period associated with the promotional display structure in a database, such as database 112. Method 300 further includes receiving 306 a beacon data record from the user device. In the example embodiment, the beacon data record includes the beacon ID, a time stamp, and location-specific data associated with a retail facility, such as retail facility 12, in which the beacon data record is generated. Additionally, method 300 includes retrieving 308 the specified retail facility and the specified time period linked to the beacon ID from the database, comparing 310 the location-specific data to the specified retail facility to determine whether the promotional display structure is displayed in the specified retail facility, and comparing 312 the specified time period to the time stamp to determine whether the promotional display structure is displayed during the specified time period.

In certain embodiments, method 300 also includes transmitting 314 a reference beacon signal from a reference beacon, such as reference beacon 130, installed at a predetermined location in the retail facility. The reference beacon signal comprises a reference beacon ID, and is configured to be received by the user device. Additionally, receiving 306 the beacon data record may further comprise receiving 316 the reference beacon ID in the beacon data record. Method 300 further may include linking 318 the beacon ID to a specified location at which the promotional display structure is intended to be displayed within the specified retail facility, and linking 320 the reference beacon ID to the predetermined location in the database. Moreover, method 300 may include retrieving 322 the specified location linked to the beacon ID from the database, retrieving 324 the predetermined location linked to the reference beacon ID from the database, and comparing 326 the predetermined location to the specified location to determine whether the promotional display structure is displayed in the specified location.

In an embodiment, method 300 additionally includes transmitting 328 a promotional message from the beacon to the user device. Alternatively or additionally, method 300 includes storing 330 the beacon data record in a set of beacon data records received from a plurality of user devices in each of a plurality of retail facilities involved in the retail display program, and evaluating 332 an effectiveness of the retail display program using the set of stored beacon data records. Furthermore, method 300 may include configuring 334 a power source, such as power source 36, for the beacon to be activated automatically when the promotional display structure is erected.

Figure 8:
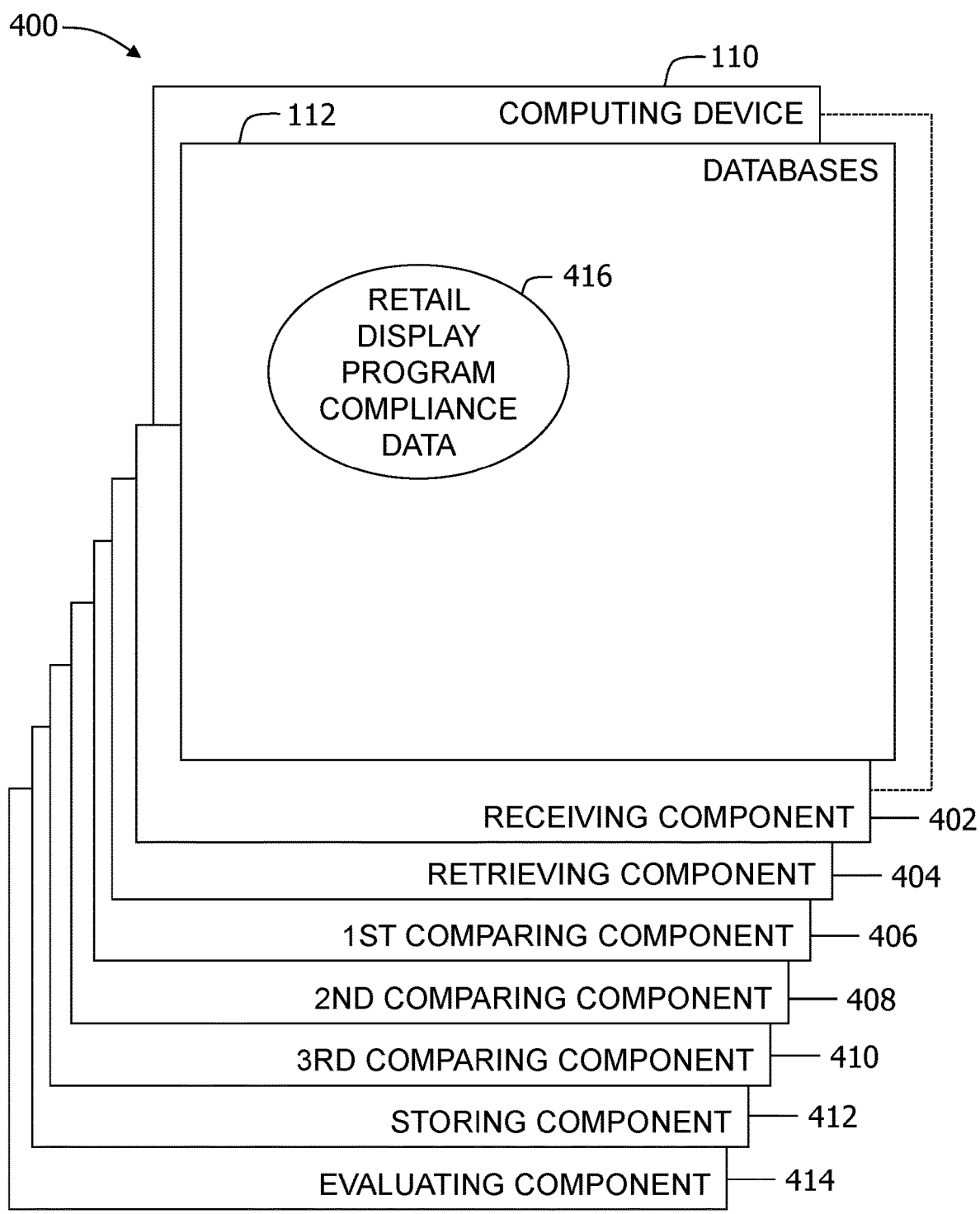
FIG. 8 is a diagram of an example embodiment of a component layout of the computing device shown in FIGS. 4 and 5.

FIG. 8 is a diagram of a component layout 400 of computing device 110, shown in FIGS. 4-5. For example, one or more computing devices may form computing device 110. FIG. 7 further shows a configuration of database 112. Database 112 is coupled to several separate components within computing device 110, which perform specific tasks.

Computing device 110 includes a receiving component 402 for receiving a beacon data record 74. Beacon data record 74 is at least partially generated by user device 70 in response to beacon signal 38 from beacon 30 coupled to promotional display structure 20. Beacon data record 74 comprises beacon ID 32, the time stamp, and location-specific data associated with the retail facility 12 in which beacon data record 74 is generated. The location-specific data may be, for example, one of a geographic position of user device 70 obtained from geo-location application 76, retail facility ID 78, or hub ID 92. In certain embodiments, beacon data record 74 further comprises reference beacon ID 132.

Computing device 110 also includes a retrieving component 404 for retrieving the specified retail facility 50 and the specified time period 62 associated with promotional display structure 20 from database 112. Database 112 links beacon ID 32 associated with promotional display structure 20 to specified retail facility 50 and specified time period 62. In certain embodiments, retrieving component 404 also is for retrieving the specified location 60 associated with promotional display structure 20 from database 12, and retrieving the predetermined location 18 associated with reference beacon ID 132 from database 112.

Computing device 110 further includes a first comparing component 406 for comparing the location-specific data to specified retail facility 50 to determine whether promotional display structure 20 is displayed in specified retail facility 50, and a second comparing component 408 for comparing specified time period 62 to the time stamp to determine whether promotional display structure 20 is displayed during specified time period 62. In certain embodiments, computing device 110 additionally includes a third comparing component 410 for comparing predetermined location 18 to specified location 60 to determine whether promotional display structure 20 is displayed in specified location 60. Alternatively or additionally, computing device 110 includes a storing component 412 for storing the beacon data record 74 in a set of beacon data records received from a plurality of user devices 70 in each of a plurality of retail facilities 12 involved in retail display program 10, and an evaluating component 414 for evaluating an effectiveness of retail display program 10 using the set of stored beacon data records.

In an example embodiment, database 112 includes, but is not limited to, a retail display program compliance data section 416. Retail display program compliance data section 416 includes data associated with a plurality of promotional display structures 20, corresponding beacons 30, specified retail facilities 50, specified locations 60, specified time periods 62, reference beacons 130, preselected locations 18, stored beacon data records 74, and other related data (shown in FIGS. 1-5).

As used herein, the terms "software" and "firmware" are interchangeable, and include any computer program stored in memory for execution by processor 152 (shown in FIG. 6), including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for (a) receiving a beacon data record, wherein the beacon data record is at least partially generated by a user device in response to a beacon signal from a beacon coupled to the promotional display structure, and wherein the beacon data record comprises a beacon ID, a time stamp, and location-specific data associated with a retail facility in which the beacon data record is generated, (b) retrieving the specified retail facility and the specified time period associated with the promotional display structure from a database, wherein the database links the beacon ID associated with the promotional display structure to the specified retail facility and the specified time period, (c) comparing the location-specific data to the specified retail facility to determine whether the promotional display structure is displayed in the specified retail facility, and (d) comparing the specified time period to the time stamp to determine whether the promotional display structure is displayed during the specified time period.

Any such resulting program, having computer-readable code means, may be embodied or provided within one or more computer-readable storage media, thereby making a computer program product, i.e., an article of manufacture, according to the discussed embodiments of the disclosure. The computer-readable storage media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The operations described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer-readable storage media and communication media. Computer-readable storage media are tangible and non-transitory and store information such as computer readable instructions, data structures, program modules, or other data. Communication media, in contrast, typically embody computer readable instructions, data structures, program modules, or other data in a transitory modulated data signal such as a carrier wave or other transport mechanism and include any information delivery media. Combinations of any of the above are also included within the scope of computer readable media.

The example embodiments described herein provide a beacon coupled to a promotional display structure. The example embodiments described herein also provide for a computing device that receives information from each beacon, relayed through a user device, such as a smart phone carried by customers and/or employees of a retail facility in which the promotional display structure is displayed. Thus, the example embodiments advantageously facilitate monitoring compliance with a retail display program across a large number of retail facilities, without need for a dedicated receiver infrastructure installed at each retail facility. In addition, a reference beacon may be used to facilitate obtaining specific location data for the promotional display structure within the retail facility. In certain embodiments, the system and methods described herein provide incentives for the operator of the user device to enable the user device to relay the beacon information.

Example embodiments of a system and methods for monitoring compliance with a retail display program are described above in detail. The system and methods are not limited to the specific embodiments described herein, but rather, components of systems and/or steps of the methods may be utilized independently and separately from other components and/or steps described herein. For example, the system may also be used for tracking compliance with other location-based programs, and is not limited to practice with only the promotional display structures described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring compliance with a retail display program, the retail display program comprising a promotional display structure intended to be displayed at a specified retail facility during a specified time period, said system comprising:
   a beacon coupled to the promotional display structure, said beacon is configured to transmit a beacon signal, said beacon signal comprises a beacon ID;
   a database linking said beacon ID to data associated with the specified retail facility and the specified time period associated with the promotional display structure, wherein the specified retail facility is associated with a hub computing device located at the specified retail facility;
   a beacon software application executable on a user device associated with a customer of the retailer and configured to:
   receive the beacon signal;
   calculate, using the received beacon signal, a proximity to said beacon;
   generate a partial beacon data record in response to the proximity of the user device being within a predetermined range of said beacon, the predetermined range being no greater than six feet, wherein the partial beacon data record comprises said beacon ID and a time stamp; and
   transmit the partial beacon data record to the hub computing device; and
   a remote computing device in communication with said database, said remote computing device is configured to:
   receive, from the hub computing device, a beacon data record including the partial beacon data record and a hub ID of the hub computing device;
   retrieve from said database the data associated with the specified retail facility and the specified time period linked to said beacon ID;
   compare the hub ID to the data associated with the specified retail facility to determine whether the promotional display structure is displayed in the specified retail facility; and
   compare the specified time period to the time stamp to determine whether the promotional display structure is displayed during the specified time period.

2. The system in accordance with claim 1, wherein the retail display program further comprises a specified location within the specified retail facility at which the promotional display structure is intended to be displayed, said system further comprising a reference beacon installed at a predetermined location in the retail facility, said reference beacon is configured to transmit a reference beacon signal, said reference beacon signal comprises a reference beacon ID, said beacon software application is configured to receive the reference beacon signal, wherein said database further links said beacon ID to the specified location and further stores said reference beacon ID along with the predetermined location, and wherein said beacon software application is configured to include the reference beacon ID in the partial beacon data record, said remote computing device is further configured to:
   retrieve the specified location linked to said beacon ID from said database;
   retrieve the predetermined location linked to said reference beacon ID from said database; and compare the predetermined location to the specified location to determine whether the promotional display structure is displayed in the specified location.

3. The system in accordance with claim 1, wherein said beacon is embedded within a material from which the promotional display structure is fabricated.

4. The system in accordance with claim 1, further comprising a power source coupled to said beacon, wherein said power source is configured to activate automatically when the promotional display structure is erected.

5. The system in accordance with claim 1, wherein said beacon is a low-energy Bluetooth device, and said beacon signal is configured to be read at a distance of up to approximately 150 feet from said beacon.

6. The system in accordance with claim 1, wherein said remote computing device is further configured to:
store the beacon data record in a set of beacon data records received from a plurality of hub computing devices including the hub computing device; and
evaluate an effectiveness of the retail display program in exposing customers to the promotional display structure based on a number of the set of beacon data records associated with said beacon.

7. The system in accordance with claim 1, wherein said remote computing device is further configured to indicate that the promotional display structure is incorrectly displayed based on a received number of the beacon data records associated with the promotional display structure.

8. The system in accordance with claim 1, wherein said beacon is further configured to transmit a promotional message to the user device.

9. The system in accordance with claim 8, wherein the promotional message includes an electronic coupon for a product associated with the promotional display structure.

10. The system in accordance with claim 8, wherein the promotional message includes a uniform resource locator ("URL") associated with a web page available on the World Wide Web.

11. The system in accordance with claim 10, wherein the web page is configured to provide the user device with said beacon software application.

12. A method for monitoring compliance with a retail display program, said method comprising:
coupling a beacon to a promotional display structure prior to shipping the promotional display structure to a retailer;
transmitting a beacon signal from the beacon coupled to the promotional display structure, wherein the promotional display structure is intended to be displayed at a specified retail facility during a specified time period, the beacon signal comprises a beacon ID;
linking the beacon ID to data associated with the specified retail facility and the specified time period associated with the promotional display structure in a database, wherein the specified retail facility is associated with a hub computing device located at the specified retail facility;
receiving the beacon signal by a beacon software application executing on a customer device associated with a customer of the retailer;
calculating, by the beacon software application using the received beacon signal, a proximity to the beacon;
generating, by the beacon software application, a partial beacon data record in response to the proximity of the user device being within a predetermined range of the beacon, the predetermined range being no greater than six feet, wherein the partial beacon data record includes the beacon ID and a time stamp;
transmitting, by the beacon software application, the partial beacon data record to the hub computing device; and
receiving, from the hub computing device by a remote computing device in communication with the database, a beacon data record including the partial beacon data record and a hub ID of the hub computing device;
retrieving, by the remote computing device from the database, the data associated with the specified retail facility and the specified time period linked to the beacon ID;
comparing, by the computing device, the hub ID to the data associated with the specified retail facility to determine whether the promotional display structure is displayed in the specified retail facility; and
comparing, by the computing device, the specified time period to the time stamp to determine whether the promotional display structure is displayed during the specified time period.

13. A method in accordance with claim 12, wherein the retail display program further comprises a specified location within the specified retail facility at which the promotional display structure is intended to be displayed, said method further comprising:
transmitting a reference beacon signal from a reference beacon installed at a predetermined location in the retail facility, the reference beacon signal comprises a reference beacon ID;
receiving, by the beacon software application, the reference beacon signal, wherein said generating the partial beacon data record further comprises including the reference beacon ID in the partial beacon data record;
linking in the database the beacon ID to the specified location and linking in the database the reference beacon ID to the predetermined location;
retrieving, by the remote computing device, the specified location linked to the beacon ID from the database;
retrieving, by the remote computing device, the predetermined location linked to the reference beacon ID from the database; and
comparing, by the remote computing device, the predetermined location to the specified location to determine whether the promotional display structure is displayed in the specified location.

14. A method in accordance with claim 12, further comprising:
storing, by the remote computing device, the beacon data record in a set of beacon data records received from a plurality of hub computing devices in each of a plurality of retail facilities involved in the retail display program; and
evaluating, by the remote computing device, an effectiveness of the retail display program using the set of stored beacon data records.

15. A method in accordance with claim 12, further comprising transmitting a promotional message from the beacon to the customer device.

16. A method in accordance with claim 15, wherein transmitting the promotional message comprises transmitting an electronic coupon for a product associated with promotional display structure.

17. A method in accordance with claim 15, wherein transmitting the promotional message comprises transmitting a uniform resource locator ("URL") associated with a web page available on the World Wide Web.

18. A method in accordance with claim 17, wherein the web page is configured to provide the customer device with the beacon software application.

19. A method in accordance with claim 12, further comprising coupling a power source to the beacon, wherein the power source is configured to activate automatically when the promotional display structure is erected.

\* \* \* \* \*